UNITED STATES PATENT OFFICE.

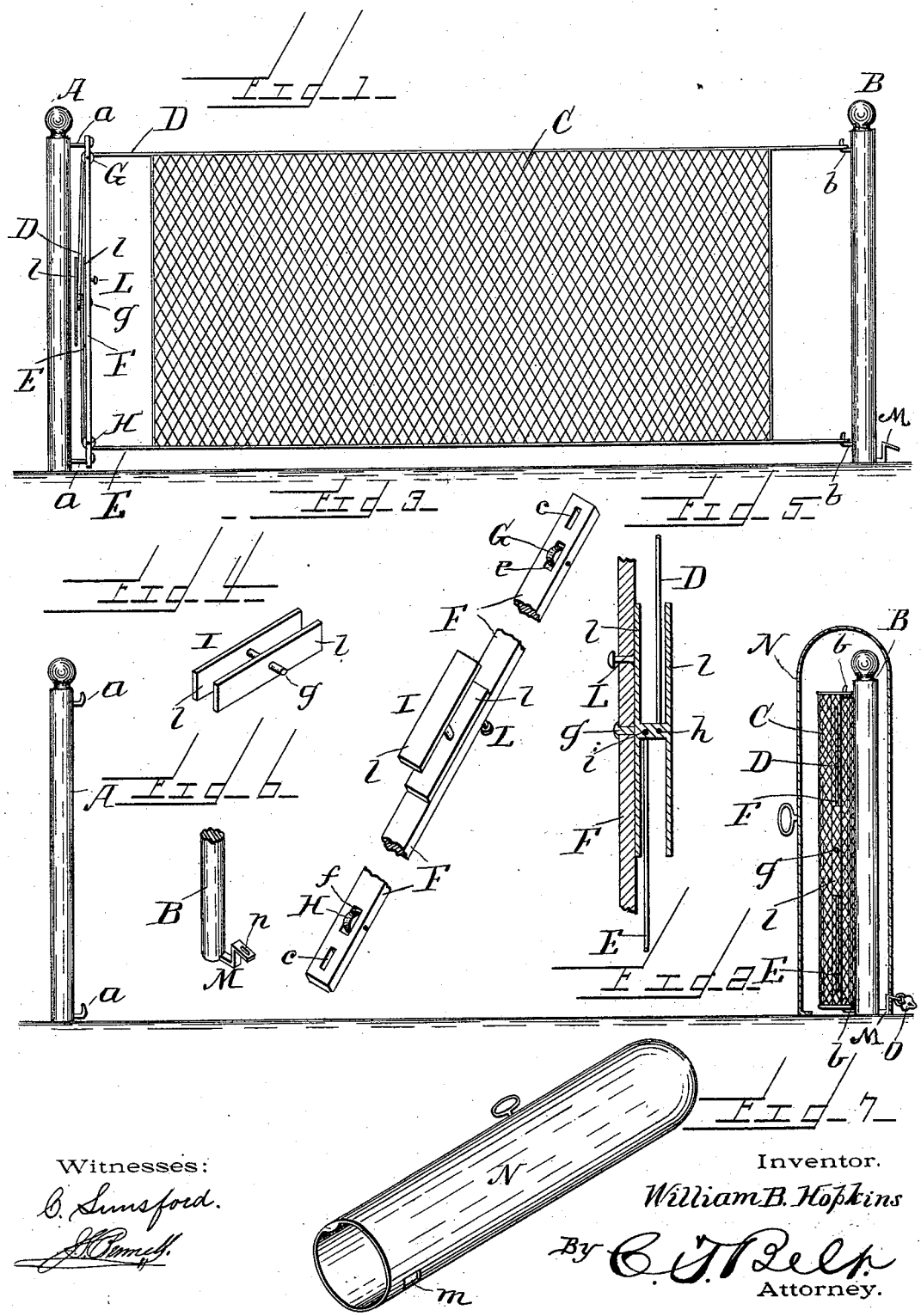

WILLIAM B. HOPKINS, OF WASHINGTON, DISTRICT OF COLUMBIA.

LAWN-TENNIS APPARATUS.

SPECIFICATION forming part of Letters Patent No. 523,912, dated July 31, 1894.

Application filed May 16, 1894. Serial No. 511,429. (No model.)

*To all whom it may concern:*

Be it known that I, WILLIAM B. HOPKINS, a citizen of the United States, residing at Washington, in the District of Columbia, have invented certain new and useful Improvements in Lawn-Tennis Apparatus, of which the following is a specification.

This invention relates to the class of lawn tennis, and particularly to a device for detachably connecting the tennis net to a post and tightening it, and to means for protecting such device and the net without removing them from the tennis court.

The object of the invention is to provide a simple, durable and inexpensive means for connecting the net to a post and to protect and preserve said means as well as the net from exposure when not in use without removing the net from the court.

A further object of the invention is to provide a tightening device for lawn tennis nets, by means of which the top and bottom guy ropes of the net are tightened simultaneously and equally one with the other, while said device at the same time stretches or spreads the net with equal uniformity throughout.

Experience has proven that it is a very difficult matter for a lady to handle a lawn tennis net; first it is impossible for such person to stretch the net properly upon the posts by hand, second it is almost impossible for the net to be stretched and rendered sufficiently taut without exposing the net and the devices for stretching it to the elements when not in use, and to avoid such exposure, the net and its tightening devices have to be removed from the court requiring repeated settings of the net; it is to overcome these difficulties and defects of the stretching devices now in vogue, that my invention is especially designed.

Other objects and advantages of the invention will hereinafter appear, and the novel features thereof will be particularly pointed out in the appended claims.

My invention consists in the improved construction of the tightening device, means for operating and protecting it and the net, whereby I greatly simplify the operation of tightening the net, and render its setting perfect; and secure from exposure when not in use.

My invention is clearly illustrated in the accompanying drawings, which, when taken in connection with the reference letters marked thereon form a part of this application, and in which—

Figure 1 is a side elevation of a lawn tennis net set up and stretched upon the ordinary posts by my improved connecting and stretching device. Fig. 2 shows the end of the net, having the connecting and stretching device, detached from one post, and the net rolled upon the said device to the other post where it is covered by my protector. Fig. 3 is a detached perspective view, partly broken away, of the connecting and tightening device. Fig. 4 is a perspective view of the windlass. Fig. 5 is a longitudinal sectional view of the portion of the device carrying the windlass, showing the manner of attaching the latter, with the slidable stop pin in elevation. Fig. 6 is a perspective view of the lower portion of the post having the locking catch. Fig. 7 is a perspective view of the protector or hood.

The same letters of reference denote the same parts throughout the several figures of the drawings.

The posts A and B, are of the usual type, provided with ordinary hooks $a$, and $b$, while the net C, is of ordinary form having top and bottom guy ropes D and E, respectively.

The connection between the net and the post B, is made in the customary way, but the connection between the post A, and the net is made by means of the rod or bar F, which may be of any suitable material but I prefer to make it of galvanized iron, having at each end an aperture $c$, through which the head of the hooks $a$, are passed so as to locate the bar firmly upon the hooks. This bar F, is provided with ordinary small rollers or guide pulleys G and H, which are journaled in the slots $e$ and $f$, of the said bar; and in the center of the latter is journaled the stem $g$, of the windlass I, by simply upsetting the end of the stem upon the opposite side of the bar from the windlass, which leaves the latter between the post A and bar F, and in the same plane with the longitudinal center of the net. This constitutes the tightening device.

The rope D, after being passed over the pulley G, is attached to the windlass at $h$, while the rope E, carried by the pulley H, is attached to the windlass at $i$, so that by turning the latter both ropes will wind upon the windlass equally and simultaneously.

The bar F, is provided with a short slidable pin L, to be pushed in engagement with one of the arms $l$, of the windlass to stop and hold the latter in any desired position.

The stem and arms of the windlass are intended to be made in the most simple inexpensive manner, but preferably of light galvanized metal; the said arms being close together and not wider than the bar F, in order that the net may be rolled upon the bar in a very compact form, as shown in Fig. 2.

The bottom of the post B, is provided with a spring catch M, or the latter may simply be firmly driven in the ground near the said post and its free end engage and project through the slot $m$, in the protector or hood N, when the latter is placed over the rolled up net, and post B. The said free end of the spring catch has an aperture $n$, to receive the ring of a suitable lock O, which renders the hood securely locked in position to thoroughly protect and house the net and tightening device when not in use without removing the same from the court. This protector may be made of any suitable waterproof material, found best fitted for the purpose.

It will be observed that after the net ropes are once put in place upon the bars and attached to the windlass, the net can be readily rolled upon and off the bar without detaching the other end of the ropes, and should it be desired to remove the net from the court it can be easily lifted from the post, against which it is rolled in a body with the tightening device, without detaching the latter from the net, displacement of the ropes, or entanglement of the net and its ropes with the said device. It will also be observed that the windlass is turned at right angles to the turn of the pulleys, and that the pull of the ropes by the windlass is equal toward the center of the bar, while the said bar stretches or spreads the net vertically at the same time it is stretched horizontally. It will be further observed that I do not prohibit the use of a central net supporting rod, as the same may or may not be used, but its use will be found not at all necessary with my improved device.

Having thus described my invention, what I claim as new, and desire to secure by Letters Patent, is—

1. In a stretching and tightening device for lawn tennis nets, the bar having apertures to connect it to a tennis post, combined with the rollers or guide pulleys journaled in the bar for the net ropes, and the windlass journaled in the bar carrying the ropes and adapted to be turned at right angles to the turn of the pulleys, as set forth.

2. In a lawn tennis apparatus, the combination of the post provided with the catch M, the tightening device, the tennis net adapted to be wrapped around the tightening device and secured to the post, and the protector adapted to be placed over the assembled parts and locked to the said catch, as set forth.

In witness whereof I hereunto set my hand in the presence of two witnesses.

WILLIAM B. HOPKINS.

Witnesses:
C. S. DRURY,
C. LUNSFORD.